US011320250B2

(12) United States Patent
Andrasi

(10) Patent No.: US 11,320,250 B2
(45) Date of Patent: May 3, 2022

(54) ASSEMBLY FOR DETECTING AN INTRUSION INTO AN APPLIANCE AND A CORRESPONDING APPLIANCE

(71) Applicant: THALES DIS CPL USA, INC., Belcamp, MD (US)

(72) Inventor: James Andrasi, Gemenos (FR)

(73) Assignee: THALES DIS CPL USA, Inc., Belcamp, MD (US)

( * ) Notice: Subject to any disclaimer, the term of this patent is extended or adjusted under 35 U.S.C. 154(b) by 78 days.

(21) Appl. No.: 16/728,725

(22) Filed: Dec. 27, 2019

(65) Prior Publication Data
US 2021/0199413 A1 Jul. 1, 2021

(51) Int. Cl.
*G01B 5/14* (2006.01)
*G01V 11/00* (2006.01)
*H05K 5/02* (2006.01)
*G06F 1/20* (2006.01)
*G06F 1/16* (2006.01)

(52) U.S. Cl.
CPC ............... *G01B 5/14* (2013.01); *G01V 11/00* (2013.01); *H05K 5/0208* (2013.01); *G06F 1/1615* (2013.01); *G06F 1/206* (2013.01); *G06F 2221/2143* (2013.01)

(58) Field of Classification Search
CPC ........ G01B 5/14; G01V 11/00; H05K 5/0208; G06F 2221/2143; G06F 1/1615; G06F 1/206
See application file for complete search history.

(56) References Cited

U.S. PATENT DOCUMENTS

| 5,428,923 A * | 7/1995 | Waggamon ............... E06B 9/80 |
| | | 250/222.1 |
| 2002/0101714 A1 | 8/2002 | Osecky et al. |
| 2015/0340795 A1 | 11/2015 | Lee et al. |

FOREIGN PATENT DOCUMENTS

| CN | 209028057 U | * 6/2019 |
| CN | 209483181 U | * 10/2019 |

(Continued)

OTHER PUBLICATIONS

School of PE ("Role of Bearings in Mechanical Engineering Applications", School of PE Mar. 8, 2017) (Year: 2017).*

(Continued)

*Primary Examiner* — Daniel R Miller
*Assistant Examiner* — Christian T Bryant
(74) *Attorney, Agent, or Firm* — Marc Boillot—Thales DIS CPL USA, Inc

(57) ABSTRACT

An assembly allows detecting an intrusion into an appliance that includes a chamber(s). At least one wall relating to one and the same chamber is designed, so as to form a chamber opening allowing to access at least one appliance chip. The assembly includes at least one baffle that is, each, disposed at the chamber opening. The assembly includes at least one chip that comprises a baffle manager. The baffle manager is configured to cause the at least one baffle to move repeatedly between a first and a second position with respect to the chamber opening, during an appliance chip operation. The baffle manager is configured to detect whether a baffle movement is slowed or blocked during the appliance chip operation. If yes, the baffle manager is configured to send a predetermined signal(s) for alerting the appliance chip or a device(s) or take an action(s).

9 Claims, 2 Drawing Sheets

(56) References Cited

FOREIGN PATENT DOCUMENTS

| GB | 2512517 A | * | 10/2014 | ............. E05F 3/221 |
| JP | 2000-073679 A | | 3/2000 | |
| JP | 2003188552 A | * | 7/2003 | ........... H05K 5/0208 |
| JP | 4295416 B2 | * | 7/2009 | |
| WO | WO-2016111728 A1 | * | 7/2016 | ............. G06F 21/86 |

OTHER PUBLICATIONS

Thomas ("General Types of Bearings and How They Work", Dec. 26, 2018, Thomasnet.com) https://web.archive.org/web/20181226025631/https://www.thomasnet.com/articles/machinery-tools-supplies/bearing-types/ (Year: 2018).*
Luna HSM Product Overview (SafeNet Inc., 007-011136-007, Jul. 4, 2014) (Year: 2014).*
Easter et al. (FIPS 140-3, Section 5—Physical Security, National Institute of Standards and Technology, Sep. 28, 2005) (Year: 2005).*
Notification of Transmittal of the International Search Report and the Written Opinion of the International Searching Authority (Forms PCT/ISA/220, PCT/ISA/210, and PCT/ISA/237) dated Apr. 7, 2021, in corresponding International Application No. PCT/US2020/066855. (11 pages).

* cited by examiner

ASSEMBLY FOR DETECTING AN INTRUSION INTO AN APPLIANCE AND A CORRESPONDING APPLIANCE

FIELD OF THE INVENTION

The invention relates to an assembly for detecting an intrusion into an appliance.

Furthermore, the invention also pertains to a corresponding appliance.

The appliance includes, among other devices, a Hardware Security Module (or HSM) type device, a server, a terminal, a mobile (tele)phone, a Personal Digital Assistant (or PDA), a laptop, a Personal Computer (or PC) and a user terminal, a tablet, a desktop computer, a media-player, a game console, a netbook, a smart watch, a smart jewel (or jewelry), a handset and/or a set-up box type device.

STATE OF THE ART

It is known to use one or several baffles, as security elements, to ensure that there is no obstructed access to a circuitry that is located in an appliance. Such security elements allow providing a strong casing with a protection against a direct probing in the appliance.

However, such security elements do not prevent an attacker who uses a flexible or an articulated probe to bypass the security elements and introduce such a probe into the appliance.

There is a need of a solution that allows preventing from introducing notably a flexible or an articulated probe into the appliance.

SUMMARY OF THE INVENTION

The invention proposes a solution for satisfying the just herein above specified need by providing an assembly for detecting an intrusion into an appliance.

According to the invention, the appliance includes at least one chamber. At least one wall relating to one and the same chamber is designed so as to form a chamber opening allowing to access at least one appliance chip. The assembly includes at least one baffle. The at least one baffle is, each, disposed at the chamber opening. The assembly includes at least one chip. The chip comprises a baffle manager. The baffle manager is configured to:
- cause the at least one baffle to move repeatedly between a first and a second position with respect to the chamber opening, during an operation of the at least one appliance chip;
- detect whether the baffle movement is or is not slowed or blocked during the appliance chip operation; and
- send, only if the baffle movement is slowed or blocked during the appliance chip operation, to the at least one appliance chip or at least one device, at least one predetermined signal for alerting the at least one appliance chip or the at least one device; or
- take, only if the baffle movement is slowed or blocked during the appliance chip operation, at least one predetermined action.

The principle of the invention consists in providing an appliance, at one or several chamber openings to access the appliance interior, with, at each chamber opening, one or several baffles that are controlled through a chip. The chip constantly moves the baffle(s) between a first and a second position with respect to the chamber opening when the appliance is operating. The chip identifies or detects whether a baffle movement is (or not) prevented from occurring between the first and the second position. Only if an impediment to the baffle movement is detected, as an occurrence of a tamper event, the chip alerts an appliance chip(s) or a device(s) or takes one or several predefined actions.

The baffle(s) move(s) dynamically with respect to a or each chamber opening and become(s), thanks to the chip, active.

It is to be noted that the baffle movement includes, among others, a baffle translation and/or a baffle rotation.

The invention solution thus renders the baffle(s) active.

The invention solution allows, using an active baffle(s), preventing from an introduction of an external physical element(s) in a thus protected chamber.

The invention solution is technically simple and efficient against any physical intrusion, through a chamber opening(s), into an appliance that is equipped with such an assembly based on an active baffle(s) at each concerned chamber opening.

Contrary to the aforementioned prior art solution using a passive baffle(s), the invention solution allows, using an active baffle(s), preventing from introducing, through a chamber opening(s), notably a flexible or an articulated probe into the appliance.

The invention solution allows thus protecting the appliance from a physical attack and therefore improving the appliance security.

Preferably, the first position includes a position that is substantially closed with respect to the chamber opening and the second position includes a position that is at least partially open with respect to the chamber opening.

According to a further aspect, the invention is an appliance for detecting an intrusion into the appliance.

According to the invention, the appliance includes at least one chamber. At least one wall relating to one and the same chamber is designed so as to form a chamber opening allowing to access at least one appliance chip. The assembly includes at least one baffle. The at least one baffle is, each, disposed at the chamber opening. The assembly includes at least one chip. The chip comprises a baffle manager. The baffle manager is configured to:
- cause the at least one baffle to move repeatedly between a first and a second position with respect to the chamber opening, during an operation of the at least one appliance chip;
- detect whether the baffle movement is or is not slowed or blocked during the appliance chip operation; and
- send, only if the baffle movement is slowed or blocked during the appliance chip operation, to the at least one appliance chip or at least one device, at least one predetermined signal for alerting the at least one appliance chip or the at least one device; or
- take, only if the baffle movement is slowed or blocked during the appliance chip operation, at least one predetermined action.

BRIEF DESCRIPTION OF THE DRAWINGS

Additional features and advantages of the invention will be apparent from a detailed description of one preferred embodiment of the invention, given as an indicative and non-limitative example, in conjunction with the following drawings.

DETAILED DESCRIPTION

Herein under is considered a case in which the invention assembly for detecting an intrusion into an HSM with a single chamber uses a chip that is included in the assembly and that controls, in a synchronized manner, two baffles disposed at the chamber opening.

According to an alternative embodiment (not represented), the invention assembly for detecting an intrusion into an appliance with several chambers uses a chip that is included in the assembly and that controls a single baffle disposed at each chamber opening. According to such an alternative embodiment, the chip and each baffle carry out the functions that are described infra and that are carried out by the chip and each of the two baffles respectively.

Naturally, the herein below described embodiment is only for exemplifying purposes and is not considered to reduce the scope of the invention.

Figure 1:
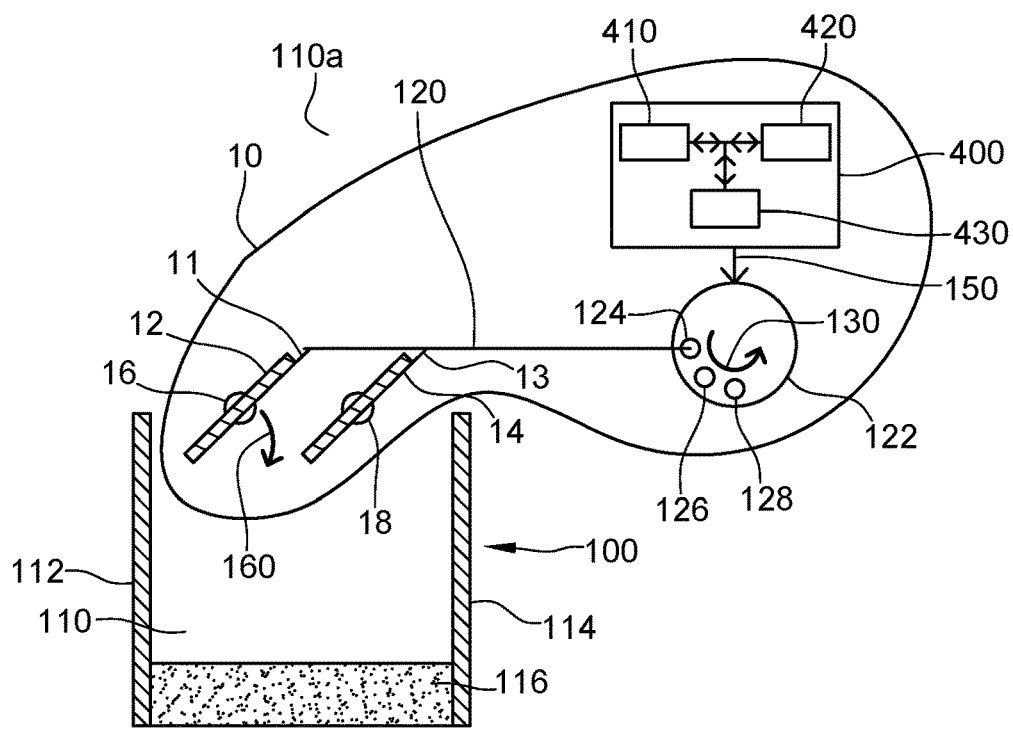
FIG. 1 is a cross-sectional view of an embodiment of an appliance with a single chamber with an opening that is partially open through two active baffles, according to the invention.

FIG. 1 presents schematically notably an assembly 10 and a single chamber 100 included in an HSM, as an appliance.

Instead of an HSM, the appliance may include any other electronic device.

The HSM includes a Printed Circuit Board (or PCB) that comprises one or several electronic circuits with one or several chips that may manage one or several cryptographic keys.

An attacker may attempt to access inside the HSM notably to observe and spy any electronic circuit and access data and/or the key(s).

The HSM includes a casing or housing (not represented) that includes one or several chambers.

For a sake of simplicity, only one chamber 100 has been represented.

The chamber 100 may include one or several walls 112 and 114. The walls 112 and 114 are (physically) designed, so as to form a chamber opening.

The chamber opening divides the space in two parts, namely an interior 110 of the chamber 100 and an exterior 110a of the chamber 100.

The chamber opening may allow, when at least partially open, a gas to flow either from the chamber exterior 110a to the chamber interior 110 or conversely, i.e. from the chamber interior 110 to the chamber exterior 110a. In other words, the chamber opening may include, when at least partially open, an air inlet, i.e. the air enters through the chamber opening into the chamber interior 110, or an air outlet, i.e. the air exits through the chamber opening out of the chamber interior 110.

The chamber opening allows accessing, from the chamber exterior 110a, into the chamber interior 110.

The chamber opening is the space that separates the two walls 112 and 114 of the chamber and is e.g. horizontal.

Alternately, the chamber opening is vertical or inclined in any direction between the horizontal and the vertical.

The chamber opening allows accessing a base 116 that is inside the chamber 100.

The base 116 may incorporate or be connected to an HSM chip(s) (not represented).

The base 116 may include a fan (not represented).

The or each HSM chip includes one or several (micro) processors and/or a (micro)controller(s), as data processing means (not represented), one or several memories, as data storing means (not represented), and an Input/Output (or I/O) interface(s) (not represented) that are internally all connected, through an internal bidirectional data bus.

The assembly 10 includes a chip 400.

The chip 400 may be included in a Secure Element (or SE).

Within the present description, an SE is a smart object that includes a chip(s) that protect(s), as a tamper resistant component(s), access to stored data and that is(are) intended to communicate data with an external device(s), like e.g., an SE host device, such as a mobile phone, a PC, or an HSM type device.

The SE chip, as a chip incorporated, possibly in a removable manner, in the HSM, as an SE host device, includes notably an embedded SE (or eSE), an embedded Universal Integrated Circuit Card (or eUICC), an embedded Subscriber Identity Module (or eSIM) and a Trusted Execution Environment (or TEE), as a secure area of a (SE host device) processor and a secured runtime environment, within the SE host device.

Alternatively, instead of an SE chip that is embedded in the SE host device, the SE chip may be removable from the SE host device. As removable, the SE chip may be a SIM type card, a Secure Removable Module (or SRM), a smart dongle of the USB (acronym for "Universal Serial Bus") type, a (micro-) Secure Digital (or SD) type card or a Multi-Media type Card (or MMC) or any format card to be coupled to the SE host device.

The chip 400 includes one or several (micro)processors and/or a (micro)controller(s) 410, as data processing means, one or several memories 420, as data storing means, and at least two I/O interfaces that are internally all connected, through an internal bidirectional data bus.

The assembly 10 includes two baffles 12 and 14. Each of the two baffles 12 and 14 is disposed at the chamber opening.

The chip 400 stores an Operating System (or OS) and an invention application for managing the two baffles 12 and 14, as a baffle manager.

The baffle manager is configured to cause the baffles 12 and 14 to move repeatedly between two positions with respect to the chamber opening, during an HSM chip operation.

The baffles 12 and 14 are represented in a position that is at least partially open with respect to the chamber opening, as either a first position with respect to the chamber opening or an intermediary position between the first and a second position with respect to the chamber opening.

The baffle manager is preferably arranged to cause the baffles 12 and 14 to move, preferably in a synchronized manner (i.e. simultaneously), between the first position with respect to the chamber opening and the second position with respect to the chamber opening, during an HSM chip operation.

The baffle movement is e.g., substantially a rotation of each baffle 12 or 14 around its respective pivot 16 or 18, as a rotation axis.

According to another embodiment (not represented), the baffle movement is substantially a translation of each baffle.

In other words, the baffle slides at the chamber opening to close or open the chamber opening.

According to still another embodiment (not represented), the baffle movement is substantially a translation of at least part of the baffles and also substantially a rotation of a complementary part of the baffles. In other words, a part of the baffles slides at the chamber opening while the other part of the baffles rotates at the chamber opening to close or open the chamber opening.

The baffle manager allows automating the baffle movement, namely a translation of one or several baffles and/or a rotation of one or several baffles between the first and the second position with respect to the chamber opening.

The baffle manager allows moving the baffles 12 and 14 with respect to the chamber opening, thereby rendering the baffles 12 and 14 dynamic.

No static chamber opening is available notably to probing.

To rotate the baffles 12 and 14, each of the baffles 12 and 14 may be coupled to a camshaft 122.

To couple the baffles 12 and 14 to the camshaft 122, each of the baffles 12 and 14 is equipped at its end with a respective extension 11 and 13.

The extensions 11 and 13 allow linking the baffles 12 and 14 to a connecting rod 120.

The connecting rod 120 is connected, through an attachment point 124, to the camshaft 122.

The camshaft 122 is connected or communicatively coupled, through a first connection 150, to the chip 400.

The baffle manager is arranged to control the camshaft 122.

The baffle manager is configured to turn the camshaft 122 in a counter-clockwise direction 130 and reversely.

The camshaft 122 allows causing a synchronised rotation or oscillation of the baffles 12 and 14 between the first and the second position with respect to the chamber opening.

The camshaft 122 is preferably equipped with a position sensor 126.

The position sensor 126 is connected or communicatively coupled to the chip 400 that supports the baffle manager.

The position sensor 126 allows measuring a time duration relating to the baffle oscillation between the first position with respect to the chamber opening and the second position with respect to the chamber opening.

The baffle manager is preferably adapted to detect whether the baffle oscillation time duration does or does not exceed a predetermined time period threshold, such as a few seconds.

According to an essential invention feature, the baffle manager is configured to detect whether the movement of at least one baffle 12 (and/) or 14, such as a baffle rotation and/or a baffle translation, is or is not slowed or blocked during the HSM chip operation.

As long as the movement of the baffles 12 and 14 is not slowed or blocked during the HSM chip operation, the baffle movement is normal and the baffle manager authorizes continuing e.g., moving repeatedly between the first position and the second position with respect to the chamber opening, during an HSM chip operation.

Otherwise, the baffle movement that is slowed or blocked during the HSM chip operation is characteristic of an attempt of a physical intrusion into the HSM. Such a baffle movement is therefore considered as being abnormal. The baffle manager detects thus any impediment, obstacle or obstruction that prevents at least one of the baffles 12 and 14 from moving between the first position and the second position with respect to the chamber opening, during an HSM chip operation.

Only if the movement of the baffles 12 and 14 is slowed or blocked during the HSM chip operation, as a detection of an occurrence of a tamper event, the baffle manager is configured to send:

to the HSM chip(s), a predetermined signal for alerting the HSM chip(s); and/or to one or several devices, such as one or several local or remote servers, a predetermined signal for alerting the HSM chip(s).

Alternately, instead of simply alerting the HSM chip(s) or (an)other device(s), the baffle manager is adapted to take one or several predetermined actions, such as e.g., the baffle manager sends, to the HSM chip(s), a command for erasing the contents of all of the memories of the HSM. Thus, the or each HSM chip erases, based on the concerned received command, all of the data stored in its memories. In such a case, any attacker can no longer access any data since the data does no longer exist.

To detect such a possible slow down or blocking of the baffle movement that is constituted by the baffle rotation or oscillation, the baffle manager is preferably configured to detect whether the baffle oscillation time duration does or does not exceed a predetermined time period threshold, such as a few seconds, like e.g., 3 s.

The two baffles 12 and 14 are e.g., in a raised position. When the two baffles 12 and 14 are in such a raised position, the attachment point 124 is in a position that is e.g., at 9.00 am (or pm) while referring to a time presented by a clock.

The two baffles 12 and 14 are then both simultaneously driven in rotation in a clockwise direction 160, through the connecting rod 120 and the camshaft 122 that turns in the counter-clockwise direction 130, by the baffle manager.

The camshaft 122 passes, while turning in the counter-clockwise direction 130, through the baffle manager control, the attachment point 124 from the 9.00 am (or pm) position to another position that is e.g., at 6.00 am (or pm).

FIG. 1 presents the two baffles 12 and 14 that are thus in a position that at least partially open with respect to the chamber opening, as the first position with respect to the chamber opening.

Figure 2:
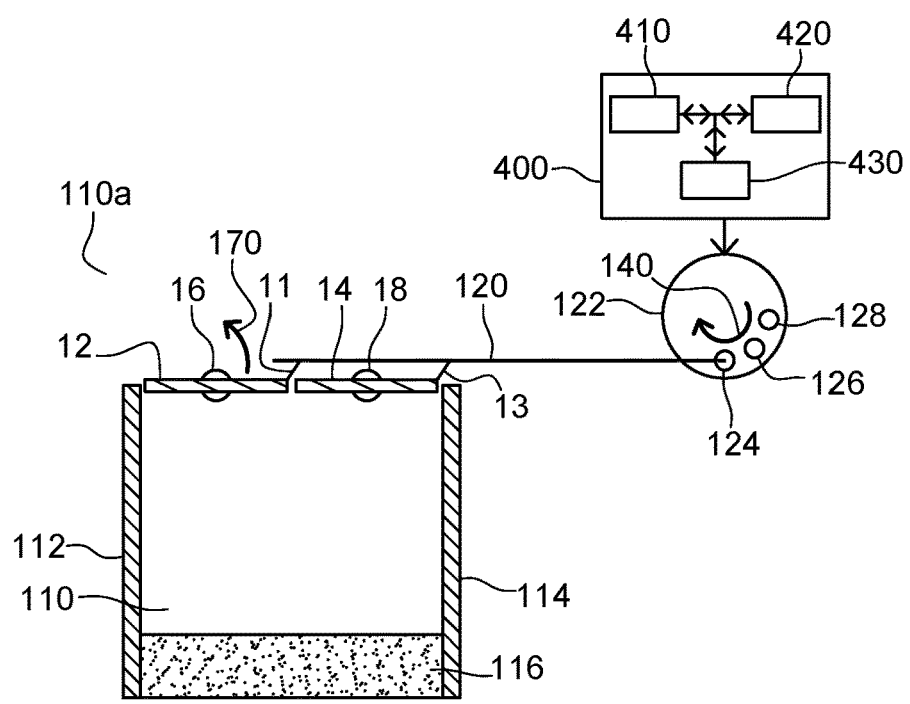
FIG. 2 is a cross-sectional view of the appliance of FIG. 1 with the opening that is substantially closed with the two active baffles, according to the invention.

The two baffles 12 and 14 dynamically rotate, under the baffle manager control, in the clockwise direction 160 to arrive, at the configuration that is presented in the FIG. 2, in which the two baffles 12 and 14 that are in a second position that is substantially closed with respect to the chamber opening.

The baffle manager is configured to cause the baffles 12 and 14 to move from the first position with respect to the chamber opening to the second position with respect to the chamber opening, during an HSM chip operation.

FIG. 2 shows, further to a camshaft 122 turning, the chamber opening that is, through the two active baffles 12 and 14, substantially closed with respect to the chamber opening, as the second position with respect to the chamber opening.

The references of the different elements used for the FIG. 2 that are common with the FIG. 1 are the ones used for the FIG. 1.

The chip 400 that supports the baffle manager and the HSM chip(s) are powered.

The baffle manager is executed by a processor or a controller that is included in a chip that is either included in the HSM chip(s) or separate from the HSM chip(s).

The camshaft 122 is preferably equipped with a position lock 128.

The position lock 128 is controlled, through the camshaft 122, by the baffle manager.

The position lock 128 allows locking the baffles 12 and 14 in a substantially closed position with respect to the chamber opening, when the power is at least reduced.

When the power is reduced or cut, the baffle manager is still able to close, through the active baffles 12 and 14, the chamber opening.

The chamber opening is thus, using the baffle manager and the active baffles, substantially closed and therefore protected against any physical intrusion in the HSM.

The baffle manager and the active baffles allow therefore improving the physical security of the HSM.

The chamber opening may disallow, when substantially closed, any gas to flow either from the chamber exterior 110a to the chamber interior 110 or conversely, i.e. from the chamber interior 110 to the chamber exterior 110a. In other words, the chamber opening may include, when substantially closed, a gas passage blocking.

The two baffles 12 and 14 are e.g., in a lying position. When the two baffles 12 and 14 are in the lying position, the attachment point 124 is in a position that is e.g., at 6.00 am (or pm) while referring to a time presented by the clock.

The camshaft 122 is also preferably configured to turn in a clockwise direction 140.

Then, the two baffles 12 and 14 are both simultaneously driven, in rotation, in a counter-clockwise direction 170, through the connecting rod 120 and the camshaft 122 that turns in the clockwise direction 140, by the baffle manager.

The camshaft 122 passes, while turning in the clockwise direction 140, through the baffle manager control, the attachment point 124 from the 6.00 am (or pm) position to another position that is e.g., at 9.00 am (or pm).

FIG. 2 presents the two baffles 12 and 14 that are in a substantially closed position, as the second position with respect to the chamber opening.

The two baffles 12 and 14 then dynamically rotate, under the baffle manager control, in the counter-clockwise direction 170 to come back, at the configuration that is presented in the FIG. 1.

The baffle manager is thus configured to cause the baffles 12 and 14 to move back from the second position with respect to the chamber opening to the first position with respect to the chamber opening, during the HSM chip operation.

The baffle manager allows detecting, i.e. sensing any mechanical impediment, obstacle or obstruction of the baffle movement.

Figure 3:
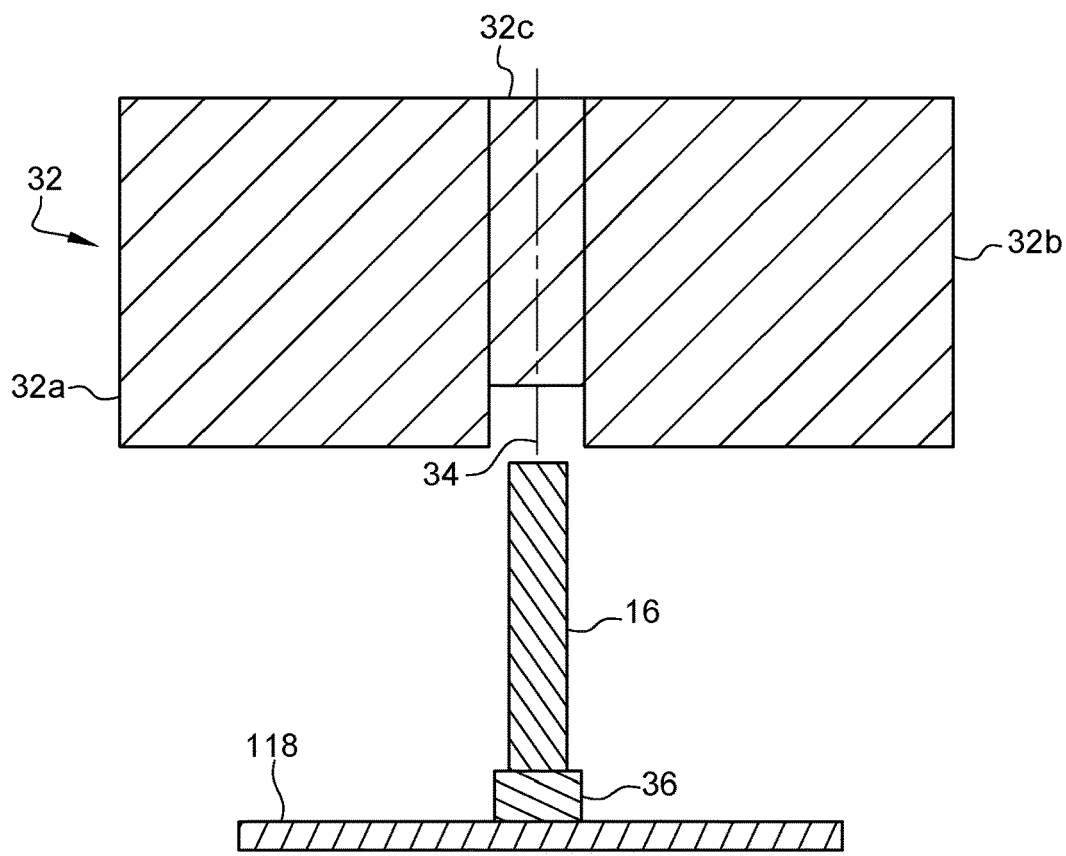
FIG. 3 illustrates a partly exploded view of a mechanical assembly that allows rotating each baffle of FIG. 1 or 2.

FIG. 3 shows a mechanical assembly that allows rotating each of the baffles 12 and 14.

For a sake of simplicity, only a single baffle 12 is represented since such a mechanical assembly is preferably identical for each of the baffles 12 and 14.

Each baffle 12 includes a vane 32.

The vane 32 may be preferably made of metal or steel, or any other material or any other compound of material, so as to be sufficiently mechanically resistant to any physical shock.

The vane 32 dimensions are such that, when the baffle 12 is in the substantially closed position with respect to the chamber opening, no physical penetration or intrusion through or around the vane 32 is possible.

The vane 32 includes preferably two semi-plates 32a and 32b.

Each of the two semi-plates 32a and 32b, and therefore the vane 32 allow preventing from a physical intrusion into the HSM and more exactly the chamber 100.

The vane 32 includes a bridge 32c that links the semi-plates 32a and 32b to each other.

The bridge 32c includes e.g., a cylinder that comprises a hole preferably in its centre.

Each baffle 12 includes a pivot 16.

The pivot 16 constitutes e.g., a cylinder that is provided for entering into the cylinder hole of the bridge 32c.

The pivot 16 may be preferably made of metal or steel, or any solid material or any solid compound of material, so as to be sufficiently robust with the time to rotate the concerned baffle.

The pivot cylinder has preferably in in its centre an axis 34.

The pivot 16 is provided for driving the two semi-plates 32a and 32b of the baffle 12 in rotation or oscillation around the axis 34.

The pivot 16 allows an oscillation or rotation movement of the concerned baffle.

Each baffle 12 includes a bearing 36.

The bearing 36 is coupled to the pivot 16.

The bearing 36 allows the pivot 16 to rotate.

The bearing 36 may be constituted by e.g., a ball (or the like) bearing to allow the pivot 16 to rotate.

The bearing 36 may be preferably made of Teflon (Trademark) or any other material, so as to be sufficiently robust with the time to rotate the pivot 16.

The bearing 36 is preferably fastened, through a bearing holder (not represented), to a chassis or a (or the) chamber wall 118.

Each baffle 12 includes an extension 11. The extension 11 is used for attaching to the connecting rod 120 (or the like), so as to drive the baffle 12 in rotation, through the camshaft 122, by the baffle manager.

The extension 11 may be preferably made of metal or steel, or any other material or any other compound of material, so as to be sufficiently robust with the time to rotate the baffle 12.

Figure 4:
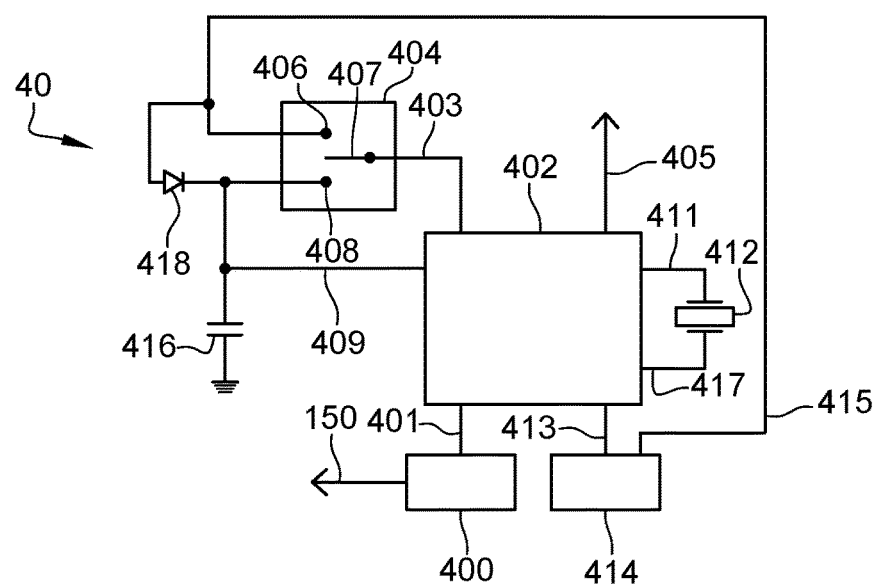
FIG. 4 presents a diagram of an invention embodiment of an electronic circuit that includes two (micro)controllers, namely a first controller that supports the baffle manager and a second controller that allows ensuring a baffle oscillation and a baffle locking in a position that is substantially closed with respect to the chamber opening, when the power is at least reduced.

FIG. 4 shows an invention electronic circuit 40.

The invention electronic circuit 40 includes the chip 400 that is connected to a second (micro)controller (or (micro) processor) 402 that allows ensuring a baffle oscillation and a baffle locking in a position that is substantially closed with respect to the chamber opening, when the power is at least reduced.

The invention electronic circuit is preferably separate from the HSM chip(s), i.e. the HSM electronic circuit.

Alternatively, instead of being separate, the invention electronic circuit is included in the HSM electronic circuit.

The chip 400 is connected or communicatively coupled, through the first connection 150, to the camshaft 122.

The chip 400 includes a first (micro)controller (or the first (micro)processor) that supports the baffle manager.

The baffle manager allows rotating, in a synchronized manner, the two baffles 12 and 14 at the chamber opening and detecting whether a baffle movement is (or not) slowed or blocked during the appliance chip operation and, if yes, takes a predefined action(s) and/or alerts the HSM chip(s) and/or a device(s).

The baffle manager controls the movement of the baffles 12 and 14. To do this, as described supra, the baffle manager is connected, through the camshaft 122 and the baffle extensions 11 and 13, to each respective baffle 12 or 14, so as to rotate (and/or translate) the baffles 12 and 14.

The baffle manager, as a movement controller, may be a mechanical assembly, an electric motor, a voice coil actuator or the like.

The chip 400, and more exactly, the first controller (or the first processor) is connected or communicatively coupled, through a second connection 401, to the second controller (or the second processor) 402.

The second controller 402 is preferably constituted by a low power controller, i.e. a controller with a power that is less than 0.5 W.

The second controller 402 is connected, through a third connection 403, to a voltage detector 404.

The voltage detector 404 includes a switch 407 between a first switch position 406 and a second switch position 408.

The first switch position 406 is connected, on one hand, to a main supply input 415 with a first reference voltage, such as a few volts, like e.g., 5 V, on another hand, to an anode of a diode 418.

The diode 418 is in series with a capacitor 416.

The second switch position 408 is connected, on one hand, to a cathode of the diode 418, as a back-up supply input with a second reference voltage, such as the first reference voltage minus 0.7 V, like e.g., 4.3 V, on another hand, to a first pad of the capacitor 416.

The voltage detector 404 allows monitoring the input voltage between the first reference voltage and the second reference voltage.

The back-up supply input with second reference voltage is provided by the first pad of the capacitor 416, when applicable (namely, only if the main supply input undergoes a drop in voltage).

The second controller 402 is also connected, through a fourth connection 409, to the first pad of the capacitor 416.

A second pad of the capacitor 416 is connected to a ground.

At a first phase, in the presence of the first reference voltage, the capacitor 416 is charged.

Once the voltage at the first pad of the capacitor 416 has reached the second reference voltage, as a predetermined threshold, the second controller 402 knows that the second switch position 408, instead of the first switch position 406, may be used, so as to constitute a back-up supply input to the second controller 402.

At a second phase, in the absence of the first reference voltage, e.g., when there is a dropping voltage, the capacitor 416 is discharged progressively from the second reference voltage (when sufficiently charged), up to the ground.

The voltage detector 404 detects whether there is or is not a dropping voltage for the main supply input.

In the affirmative, i.e. if the voltage detector 404 detects that there is the dropping voltage, the voltage detector alerts the second controller 402 about the detection of the dropping voltage.

In such a case, the second controller 402 switches the switch 407 from the main supply input to the back-up supply input by changing from the first switch position 406 to the second switch position 408.

The main supply input 415 may be connected to e.g., a USB type connector 414 (or the like) that provides an output with the first reference voltage.

The second controller 402 may be connected, through a fifth connection 413, to an I/O of the USB connector 414, so as to send or receive data, through the USB connector 414, with the exterior of the electronic circuit 40, such as the HSM chip(s). Thus, the HSM chip(s) may survey, through the USB connector 414 I/O, the health status as well as the power of the invention electronic circuit.

The second controller 402 is preferably connected, on one hand, through a sixth connection 411, to a first pad of a quartz generator 412 and, on another hand, through a seventh connection 417, to a second pad of the quartz generator 412.

The quartz generator 412 allows generating a signal with a particular frequency. The quartz generator 412 frequency is chosen, so that the second controller 402 can generate a complete cycle between the first and the second position with respect to the chamber opening that is about e.g., a few seconds, such as 3 s, namely the second to the first position followed by the first to the second position.

The second controller 402 is preferably connected, through a eighth connection 405, to the (or each) HSM chip (not represented) and/or (an)other device(s). Thus, the second controller 402 may alert the HSM chip(s) about a detection of an occurrence of a tamper event and/or take a predefined measure(s).

The second controller 402 is configured to detect whether there is or is not a dropping voltage.

The second controller 402 is adapted to switch, only if there is the dropping voltage, from the main supply input to the back-up supply input, so as to ensure a sufficient time to oscillate and lock the baffles 12 and 14 in a substantially closed position with respect to the chamber opening.

The baffle manager terminates the baffle movement by a closure of the chamber allowing avoiding any physical intrusion in the HSM.

The invention solution allows preventing, through the baffle movement, an appliance from being penetrated by a flexible or articulated probe.

The invention solution improves the physical appliance security while being simple and efficient.

The invention claimed is:

1. An assembly for detecting an intrusion into an appliance, wherein, the appliance including at least one chamber, at least one wall relating to one and the same chamber being designed so as to form a chamber opening allowing to access at least one appliance chip, the assembly including at least one baffle, the at least one baffle being, each, disposed at the chamber opening, the assembly including at least one chip, the chip comprising a baffle manager, the baffle manager is configured to:

cause the at least one baffle to move repeatedly between a first and a second position with respect to the chamber opening, during an operation of the at least one appliance chip, wherein the first position includes a position that is substantially closed with respect to the chamber opening and the second position includes a position that is at least partially open with respect to the chamber opening;

detect whether the baffle movement is or is not slowed or blocked during the appliance chip operation; and send, only if the baffle movement is slowed or blocked during the appliance chip operation, to the at least one appliance chip or at least one device, at least one predetermined signal for alerting the at least one appliance chip or the at least one device; or take, only if the baffle movement is slowed or blocked during the appliance chip operation, at least one predetermined action.

2. Assembly according to claim 1, wherein each of the at least one baffle is coupled to a camshaft, the camshaft allowing to cause a synchronised oscillation between the first and the second position with respect to the chamber opening for all of the at least one baffle, the camshaft being controlled by the baffle manager.

3. Assembly according to claim 2, wherein the camshaft is equipped with a position sensor, the position sensor allowing to measure a time duration relating to the baffle oscillation between the first position with respect to the chamber opening and the second position with respect to the chamber opening, the position sensor being connected to the baffle manager.

4. Assembly according to claim 3, wherein the baffle manager detects whether the baffle oscillation time duration does or does not exceed a predetermined time period threshold.

5. Assembly according to claim 2, wherein, the at least one appliance chip and the chip supporting the baffle manager being powered, the camshaft is equipped with a position lock, the position lock being controlled, through the camshaft, by the baffle manager, the position lock allowing locking the at least one baffle in a substantially closed position with respect to the chamber opening notably when the power is at least reduced.

6. Assembly according to claim 1, wherein each of the at least one baffle includes a vane, a pivot and a bearing, the vane allowing preventing from an intrusion into the appliance, the pivot allowing an oscillation movement of the baffle, the bearing being coupled to the pivot, the bearing allowing the pivot to rotate.

7. Assembly according to claim 1, wherein the baffle manager is executed by a controller or a processor that is included in a chip that is either included in the at least one appliance chip or separate from the at least one appliance chip.

8. Assembly according to claim 7, wherein the controller, as a first controller, or the processor, as a first processor, being included in a chip separate from the at least one appliance chip, the first controller or the first processor being connected to a second controller, the second controller being connected to a voltage detector, the second controller being configured to detect whether there is or is not a dropping voltage, the second controller being adapted to switch, only if there is the dropping voltage, from a main supply input to a back-up supply input, so as to ensure a sufficient time to oscillate the at one baffle and lock the at one baffle in a substantially closed position with respect to the chamber opening.

9. An appliance for detecting an intrusion into the appliance, wherein, the appliance including at least one chamber, at least one wall relating to one and the same chamber being designed so as to form a chamber opening allowing to access at least one appliance chip, the appliance including at least one assembly, the assembly including at least one baffle, the at least one baffle being, each, disposed at the chamber opening, the assembly including at least one chip, the chip comprising a baffle manager, the baffle manager is configured to:
- cause the at least one baffle to move repeatedly between a first and a second position with respect to the chamber opening, during an operation of the at least one appliance chip, wherein the first position includes a position that is substantially closed with respect to the chamber opening and the second position includes a position that is at least partially open with respect to the chamber opening;
- detect whether the baffle movement is or is not slowed or blocked during the appliance chip operation; and
- send, only if the baffle movement is slowed or blocked during the appliance chip operation, to the at least one appliance chip or at least one device, at least one predetermined signal for alerting the at least one appliance chip or the at least one device; or
- take, only if the baffle movement is slowed or blocked during the appliance chip operation, at least one predetermined action.

* * * * *